US011481908B2

United States Patent
Chen et al.

(12) 
(10) Patent No.: US 11,481,908 B2
(45) Date of Patent: Oct. 25, 2022

(54) DATA PROCESSING METHOD AND COMPUTING DEVICE

(71) Applicant: OmniVision Sensor Solution (Shanghai) Co., Ltd, Shanghai (CN)

(72) Inventors: Shoushun Chen, Shanghai (CN); Shizheng Wang, Shanghai (CN)

(73) Assignee: OMNIVISION SENSOR SOLUTION (SHANGHAI) CO., LTD, Shanghai (CN)

( * ) Notice: Subject to any disclaimer, the term of this patent is extended or adjusted under 35 U.S.C. 154(b) by 64 days.

(21) Appl. No.: 17/082,305

(22) Filed: Oct. 28, 2020

(65) Prior Publication Data

US 2021/0042938 A1    Feb. 11, 2021

Related U.S. Application Data (63) Continuation of application No. PCT/CN2018/088259, filed on May 4, 2018.

(30) Foreign Application Priority Data

May 4, 2018  (CN) .......................... 201810421130.0

(51) Int. Cl.
*G06T 7/20* (2017.01)
*G06T 7/269* (2017.01)
*G06T 7/215* (2017.01)

(52) U.S. Cl.
CPC .............. *G06T 7/269* (2017.01); *G06T 7/215* (2017.01)

(58) Field of Classification Search
CPC ........... G06T 7/269; G06T 7/215; G06T 7/20; G06V 20/46
See application file for complete search history.

(56) References Cited

U.S. PATENT DOCUMENTS

| | | | |
|---|---|---|---|
| 2011/0142233 A1* | 6/2011 | Kim | H04N 7/181 348/E7.085 |
| 2014/0072041 A1* | 3/2014 | Seregin | H04N 19/30 375/240.13 |
| 2015/0030204 A1* | 1/2015 | Lee | G06T 7/246 382/103 |
| 2017/0278221 A1* | 9/2017 | Ji | H04N 5/357 |
| 2017/0337469 A1* | 11/2017 | Debes | G06N 3/08 |
| 2018/0174323 A1* | 6/2018 | Ji | G06T 7/74 |

FOREIGN PATENT DOCUMENTS

| | | |
|---|---|---|
| CN | 104346427 A | 2/2015 |
| CN | 104737537 A | 6/2015 |
| CN | 107220942 A | 9/2017 |
| CN | 107610069 A | 1/2018 |

\* cited by examiner

*Primary Examiner* — Syed Haider
(74) *Attorney, Agent, or Firm* — IPro, PLLC; Na Xu (57) ABSTRACT

The present disclosure provides a data processing method and a computing device. The data processing method is adapted to process an event data flow from a DVS to acquire image frames representing changes in a scene within different time periods. The event data flow includes coordinates of each pixel whose brightness has changed. The data processing method includes: segmenting the event data flow into a plurality of data slices at a predetermined time interval; and selecting a first quantity of data slices sequentially and performing weighted calculation on the first quantity of data slices to generate the image frames representing the changes in the scene within different time periods.

8 Claims, 5 Drawing Sheets

DATA PROCESSING METHOD AND COMPUTING DEVICE

CROSS-REFERENCE TO RELATED APPLICATION

This application claims a priority of the Chinese Patent Application No. 201810421130.0 filed on May 4, 2018, which is incorporated herein by reference in its entirety.

TECHNICAL FIELD

The present disclosure relates to the field of data processing technology, in particular to a data processing method and a computing device.

BACKGROUND

Real-time optical flow calculation always plays a very important role in the field of computer vision, e.g., optical flow-based segmentation, movement detection, and target tracking and obstacle avoidance for aircrafts and vehicles. In actual use, as an urgent need, it is required to increase a speed of the optical flow calculation while ensuring high accuracy, and an optical flow is a basic element which plays a decisive role, so many optical flow calculation methods have been presented. In a conventional optical flow calculation method, a large quantity of data is captured by a conventional image sensor and then processed, so redundancy data is generated by a static ground repeatedly. The reading and processing of a large quantity of redundancy data leads to a huge computational cost as well as a restriction on a processing speed.

In addition, an even-based motion sensor has exhibited a great potential on a real-time performance of the optical flow calculation. As compared with the conventional image sensor, the motion sensor is capable of responding to an event representing a relative brightness change asynchronously. Moreover, a flow of an asynchronous digital event is outputted by the motion sensor without any restrictions from an exposure time or a frame rate. The motion sensor may detect an object which moves rapidly and the movement of which used to be captured by an expensive high-speed camera at a frame rate of several thousand Hz, but the outputted redundancy data is reduced significantly. Hence, the event-based optical flow calculation method has been widely used with respect to the motion sensor.

Generally, the event-based optical flow calculation method may include an event-based Lucas-Kanade method and a local plane fitting method. In the event-based optical flow calculation method, as an important step, slop (or gradient) information is extracted on the basis of a pixel intensity in a local area. However, in a conventional Dynamic Vision Sensor (DVS) system, the event may report a pixel position merely in the absence of illumination. Hence, the intensity of each pixel may be simulated in accordance with the quantity of events accumulated within a short time period. In this simulation method, a relative intensity change, rather than a real-time intensity, is represented, so the calculation is not accurate. In addition, as another problem, when the object that moves rapidly is detected, the accuracy of the event-based optical flow calculation may be limited by event sparsity. During the operation of the conventional DVS, each pixel operates independently, and it is impossible for the event generated by an individual activated pixel to provide sufficient information for the optical flow calculation.

Based on the above, there is an urgent need to provide a new scheme for extracting the slope information in accordance with the pixel intensity, so as to improve the speed of the optical flow calculation.

SUMMARY

An object of the present disclosure is to provide a data processing method and a computing device, so as to solve or at least alleviate at least one of the above-mentioned problems.

In one aspect, the present disclosure provides in some embodiments a data processing method for processing an event data flow from a DVS to acquire image frames representing changes in a scene within different time periods. The event data flow includes coordinates of each pixel whose brightness has changed. The data processing method includes: segmenting the event data flow into a plurality of data slices at a predetermined time interval; and selecting a first quantity of data slices sequentially and performing weighted calculation on the first quantity of data slices to generate the image frames representing the changes in the scene within different time periods.

In a possible embodiment of the present disclosure, the data processing method further includes calculating a movement direction and a movement speed of an object moving in the scene in accordance with the image frames representing the changes in the scene within different time periods.

In a possible embodiment of the present disclosure, the data processing method further includes generating a weighted sequence in accordance with a predetermined rule to perform the weighting calculation on the first quantity of data slices, and the weighting sequence includes a first quantity of weighting factors.

In a possible embodiment of the present disclosure, in the predetermined rule, the weighting factors in the weighting sequence change monotonically.

In a possible embodiment of the present disclosure, the selecting the first quantity of data slices sequentially and performing weighted calculation on the first quantity of data slices to generate the image frames representing the changes in the scene within different time periods includes: selecting the first quantity of data slices as a data group sequentially, the adjacent data groups including a same second quantity of data slices; and performing the weighted calculation on the data slices in each data group using the weighting sequence, to generate the image frame representing the change in the scene within a corresponding time period.

In a possible embodiment of the present disclosure, the selecting the first quantity of data slices sequentially and performing weighted calculation on the first quantity of data slices to generate the image frames representing the changes in the scene within different time periods further includes: performing mapping processing on the plurality of data slices to generate a plurality of slice images; and selecting a first quantity of slice images sequentially and performing the weighted calculation on the first quantity of slice images, to generate the image frames representing the changes in the scene within different time periods.

In a possible embodiment of the present disclosure, the performing the mapping processing on the plurality of data slices to generate the plurality of slice images includes: with respect to each data slice, mapping a pixel value corresponding to coordinates of a pixel in the data slice whose brightness has changed to a first value; mapping a pixel value corresponding to coordinates of a pixel in the data slice whose brightness has not changed to a second value; and creating the slice image of the data slice in accordance with the first value and the second value.

In a possible embodiment of the present disclosure, the performing the mapping processing on the plurality of data slices to generate the plurality of slice images includes: with respect to each data slice, counting the quantity of change times of each pixel in the data slice as an initial pixel value of the pixel; and mapping the initial pixel value of each pixel to a predetermined range to acquire the slice image of the data slice.

In a possible embodiment of the present disclosure, the selecting the first quantity of data slices sequentially and performing weighted calculation on the first quantity of data slices to generate the image frames representing the changes in the scene within different time periods includes: selecting a first quantity of slice images as an image group sequentially, the adjacent data groups including a same second quantity of slice images; and performing the weighted calculation on the slice images in each image group using the weighting sequence, to generate the image frame representing the change in the scene within a corresponding time period.

In a possible embodiment of the present disclosure, the first quantity is greater than the second quantity.

In a possible embodiment of the present disclosure, the performing the weighted calculation on the slice images in each image group using the weighting sequence to generate the image frame representing the change in the scene within a corresponding time period includes: performing the weighted calculation on the slice images in each image group using the weighting sequence to acquire a weighted image corresponding to each image group; and mapping each pixel value of the weighted image to a predetermined range to generate the image frame representing the change in the scene within the corresponding time period.

In another aspect, the present disclosure provides in some embodiments a computing device, including one or more processors, a memory, and one or more programs stored in the memory and executed by the one or more processors. The one or more programs include instructions for implementing the above-mentioned data processing method.

In yet another aspect, the present disclosure provides in some embodiments a computer-readable storage medium storing therein one or more programs including instructions. The instructions are executed by a computing device so as to implement the above-mentioned data processing method.

According to the data processing scheme in the embodiments of the present disclosure, the event data flow may be sliced sequentially, and the plurality of data slices may be superimposed in accordance with a certain weight to acquire the weighted image frame representing the change in the scene within a certain time period. Based on the weighted image frame, it is able to conveniently and effectively analyze a movement speed and a movement direction of an object in the scene within a certain time period, thereby to improve the speed of the optical flow calculation.

BRIEF DESCRIPTION OF THE DRAWINGS

In order to achieve the above and related objects, some descriptive aspects will be described in conjunction with the following description and drawings, and these aspects indicate various ways capable of practicing a principle of the present disclosure. All aspects and equivalent aspects thereof shall fall within the scope of the present disclosure. The above and other objects, features and advantages will become more apparent on the basis of the drawings in conjunction with the following description. Same reference signs represent a same component or element.

DETAILED DESCRIPTION

The present disclosure will be described hereinafter in more details in conjunction with the drawings and embodiments. The following embodiments are for illustrative purposes only, but shall not be used to limit the scope of the present disclosure. In contrast, the following embodiments are provided so as to facilitate the understanding of the present disclosure.

Figure 1:
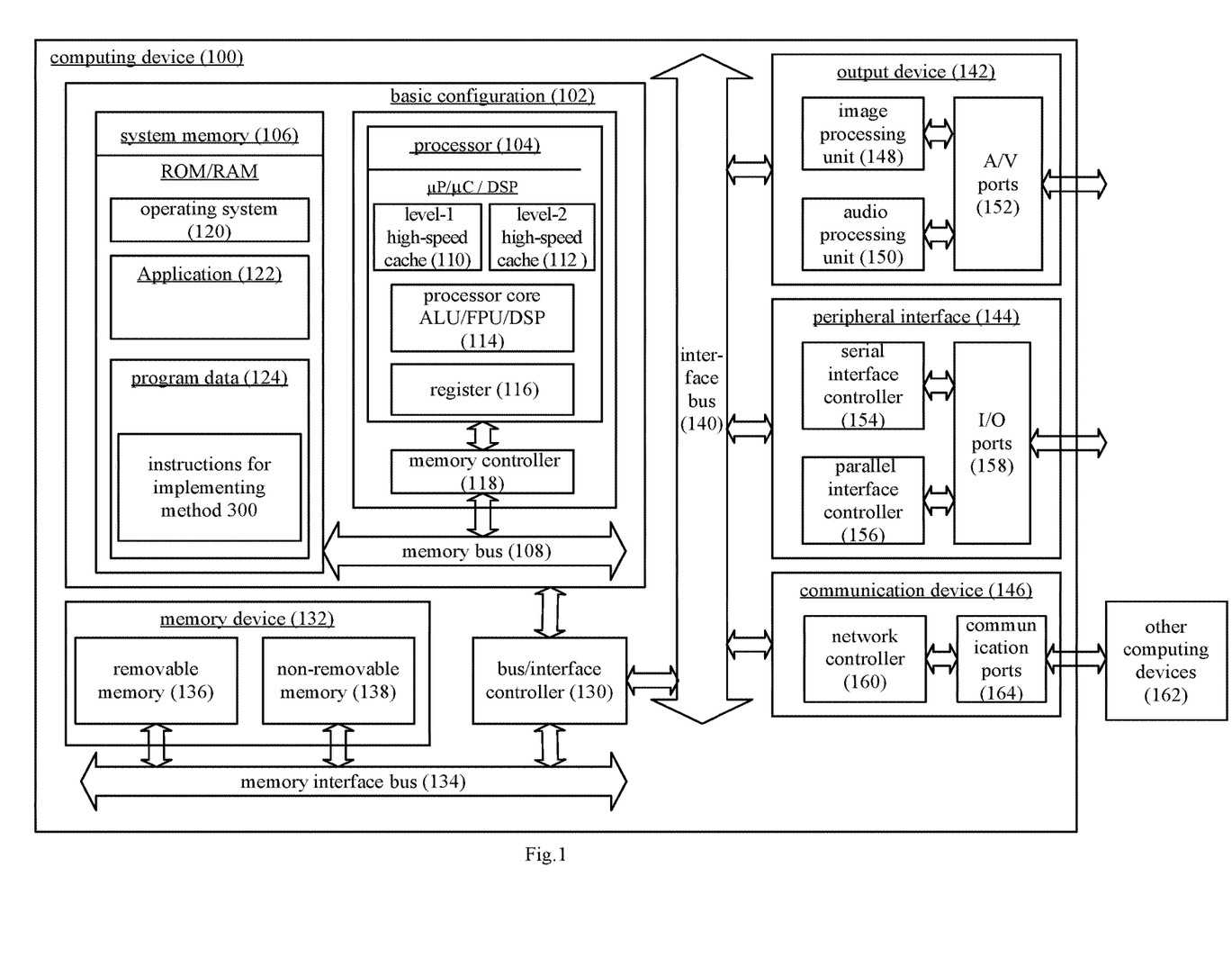
FIG. 1 is a schematic view showing a computing device 100 according to one embodiment of the present disclosure.

FIG. 1 is a block diagram of a computing device 100. In a basic configuration 102, the computing device 100 typically includes a system memory 106 and one or more processors 104. A memory bus 108 may be used for the communication between the processor 104 and the system memory 106.

Depending on a desired configuration, the processor 104 may be of any type, and it may include, but not limited to, microprocessor (µP), microcontroller (µC), Digital Signal Processor (DSP), or a combination thereof. The processor 140 may include one or more levels of high-speed caches (e.g., a level-1 high-speed cache 110 and a level-2 high-speed cache 112), a processor core 114 and a register 116. The processor core 114 may include an Arithmetic Logical Unit (ALU), a Float Point Unit (FPU), a DSP core, or a combination thereof. A memory controller 118 may be used together with the processor 104, or in some embodiments of the present disclosure, the memory controller 118 may be an internal component of the processor 104.

Depending on a desired configuration, the system memory 106 may be of any type, and it may include, but not limited to, volatile memory (e.g., Random Access Memory (RAM)), non-volatile memory (e.g., Read Only Memory (ROM) or flash memory), or a combination thereof. The system memory 106 may include an operating system 120, one or more applications 122, and a program data 124. In some embodiments of the present disclosure, the application 122 may be operated using the program data 124 on the operating system. In some embodiments of the present disclosure, the computing device 100 is configured to execute a data processing method 300, and the program data 124 may include instructions for implementing the method 300.

The computing device 100 may further include an interface bus 140 for the communication between various interface devices (e.g., an output device 142, a peripheral interface 144 and a communication device 146) and the basic configuration 102 via a bus/interface controller 130. The output device 142 may include a graphical processing unit 148 and an audio processing unit 150, which are configured to facilitate the communication with various external devices, e.g., display and loudspeaker, via one or more A/V ports 152. The peripheral interface 144 may include a serial interface controller 154 and a parallel interface controller 156, which are configured to facilitate the communication with the external devices, such as input devices (e.g., keyboard, mouse, pen, voice input device and image input device) or the other devices (e.g., printer or scanner) via one or more I/O ports 158. The communication device 146 may include a network controller 160, which is configured to communicate with one or more other computing devices 162 using a network communication link via one or more communication ports 164.

The network communication link may be an instance of a communication medium. Usually, the communication medium may be embodied as a computer-readable instruction, data structure or program module in a modulated data signal such as carrier or the other transmission mechanism, and it may include any information delivery medium. For the so-called modulated data signal, one or more data sets of the modulated data signal or the modulated data signal itself may be changed through encoding information in a signal. As a non-restrictive example, the communication medium may include a wired medium (e.g., wired network or private wire network), or a wireless medium (e.g., sound, Radio Frequency (RF), microwave, infrared (IR) or the like). The term "computer-readable medium" may include both the memory medium and the communication medium.

The computing device 100 may be a personal computer, e.g., desk-top computer or laptop computer. Of course, the computing device 100 may also be a part of a small-size portable (or mobile) electronic device, e.g., cellular phone, digital camera, PDA, Personal Media Player, wireless network browser, heat-mounted device, application-specific device, or a device including the above functions, which will not be particularly defined herein.

In the optical flow calculation, usually a conventional image sensor is replaced with a motion sensor, because the motion sensor is capable of responding to an event representing a relative brightness change. In one implementation mode, a dynamic vision sensor (event camera) may be arranged in a scene, and when no object moves in the scene, the dynamic vision sensor does not display any content. However, once the movement of the object in the scene has been detected (i.e., there is a light change), an event data flow for dynamic pixels (i.e., pixels whose brightness has changed) may be outputted.

Figure 2:
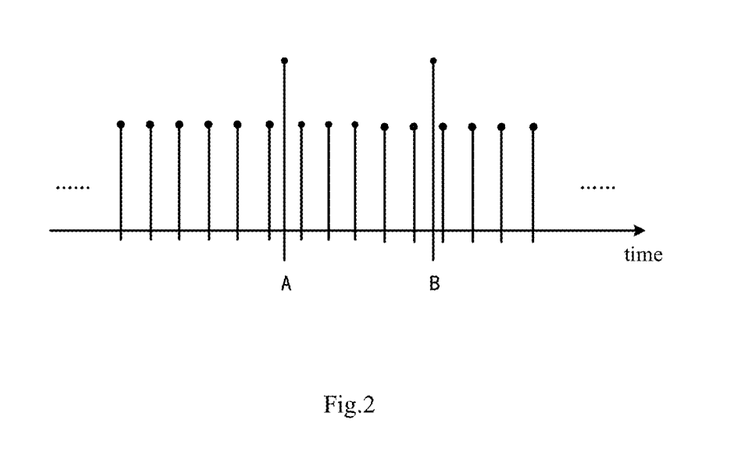
FIG. 2 is a schematic view showing an event data flow according to one embodiment of the present disclosure.

FIG. 2 shows the event data flow outputted by the dynamic vision sensor. The data flow merely includes pixel information about the pixels whose brightness has changed, so the event data flow may also be called as dynamic pixel sequence. Generally, the pixel information may include coordinates of each pixel (row and column), a pixel intensity and a time when the brightness changes. As shown in FIG. 2, with the elapse of time, the dynamic vision sensor may output the pixel information about the dynamic pixels continuously. Each short line represents the pixel information about one dynamic pixel, and the pixel information about 5 dynamic pixels are outputted sequentially within a time period from time point A to time point B. It should be appreciated that, the quantity of outputted dynamic pixel sequences and an output interval in FIG. 2 are merely for illustrative purposes, and they will not be particularly defined herein.

According to the data processing method in the embodiments of the present disclosure, the event data flow from the dynamic vision sensor may be processed, so as to generate different image frames representing the changes in the scene within different time periods. As a result, it is able to analyze the movement in the scene in accordance with the image frames subsequently, thereby to improve the speed of the optical flow calculation.

Figure 3:
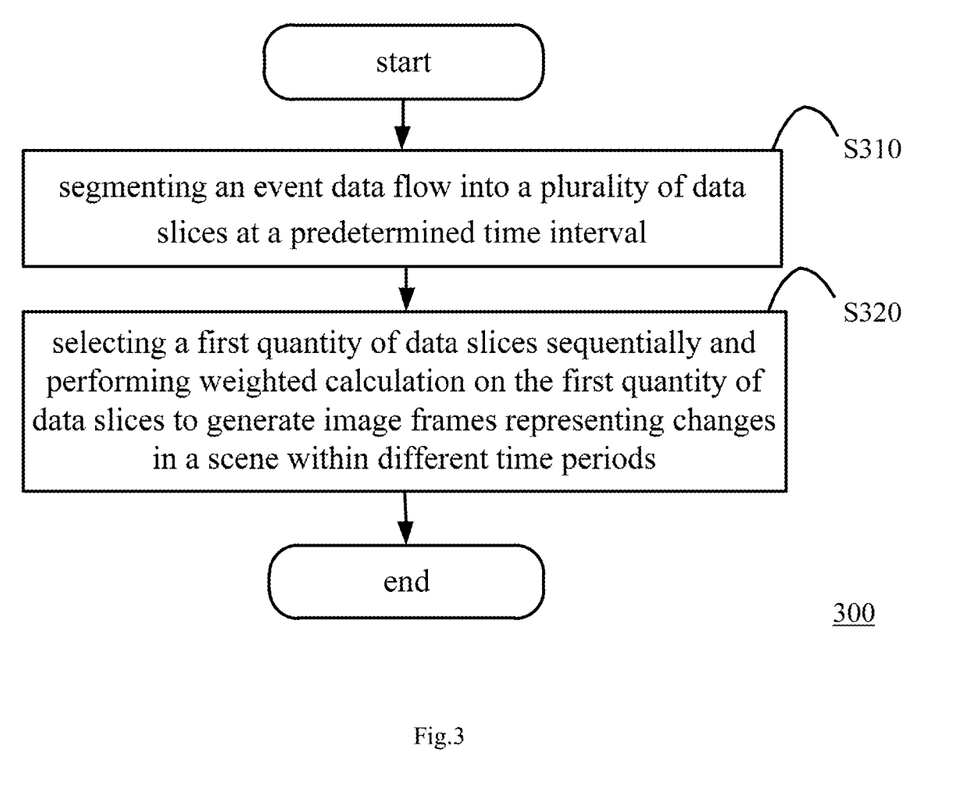
FIG. 3 is a flow chart of a data processing method 300 according to one embodiment of the present disclosure.

The present disclosure provides in some embodiments a data processing method 300 which, as shown in FIG. 3, includes the following steps.

Step S310: reading and storing an event data flow from a dynamic vision sensor, and segmenting the stored event data flow into a plurality of data slices at a predetermined time interval. In some embodiments of the present disclosure, the predetermined time interval may be 30 ms. In other words, the event data flow may be segmented into a plurality of segments each with a length of 30 ms, and each data segment having a length of 30 ms is just one data slice. Of course, the predetermined time interval will not be particularly defined herein, and in actual use, different time intervals may be provided according to the practical need.

Figure 4:
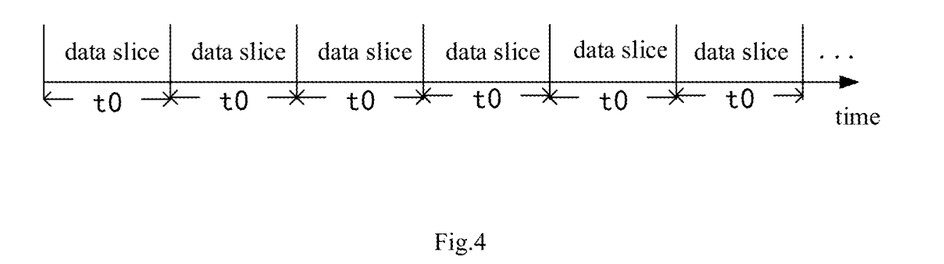
FIG. 4 is a schematic view showing the segmentation of a data flow into data slices according to one embodiment of the present disclosure.

FIG. 4 shows the segmentation of the data flow into the data slices. As show in FIG. 4, events may be generated continuously over time, and one data slice (also called as slice) may be generated at the predetermined time interval t0.

Step S320: selecting a first quantity of data slices sequentially and performing weighted calculation on the first quantity of data slices to generate image frames representing changes in a scene within different time periods.

In the embodiments of the present disclosure, prior to performing the weighted calculation, the method 300 may further include generating a weighting sequence ($w_1$, $w_2$, $w_3$, ... $w_i$) including a first quantity of weighting factors in accordance with a predetermined rule, so as to perform the weighted calculation on the selected first quantity of data slices. Values of the weighting sequence will not be particularly defined herein, and a group of random values may be selected. It should be appreciated that, the weighting sequence may be generated using any random value generation algorithm, and it may be in any appropriate form, as long as the predetermined rule is met. In other words, the weighting sequence does not need to be properly random, and although with certain randomness, the values of the weighting factors may change in accordance with a certain rule. In the embodiments of the present disclosure, the weighting factors may change monotonically. Further, during the generation of the weighting sequence, a ratio of the weighting factors may be set, e.g., (16, 8, 4, 2).

In the method 300, the generated image frames may be significantly affected by the weighting sequence. Usually, the larger the value of the weighting factor, the more important the information about the data slice corresponding to the weighting factor.

In some embodiments of the present disclosure, in order to highlight current movement information about an object moving in the scene and a movement trajectory thereof, a weighting factor corresponding to a current data slice may be provided with a largest value, and the values of the other weighting factors may be scaled down proportionally. Table 1 shows a weighting sequence having 10 weighting factors. However, in actual use, the values of the weighting factors in the weighting sequence may be set flexibly, i.e., the values will not be particularly defined herein.

TABLE 1

Example of weighting sequence

| $w_1$ | $w_2$ | $w_3$ | $w_4$ | $w_5$ | $w_6$ | $w_7$ | $w_8$ | $w_9$ | $w_{10}$ |
|---|---|---|---|---|---|---|---|---|---|
| 1 | 1 | 2 | 2 | 4 | 4 | 8 | 8 | 16 | 16 |

In some other embodiments of the present disclosure, in order to highlight initial movement information about the object moving in the scene (e.g., where the object comes from), a weighting factor corresponding to a data slice at a previous time point may be provided with a larger value. In yet some other embodiments of the present disclosure, when attentions are merely paid to the movement trajectory of the object moving in the scene, a same weighting factor may be provided for a plurality of data slices.

Examples of the weighting sequence have been given hereinabove, and in actual use, an appropriate weighting sequence may be selected according to the scene.

In the embodiments of the present disclosure, Step 320 may include the following two sub-steps.

In a first sub-step, the first quantity of data slices may be selected sequentially as a data group, and the data group may include pixel information about a pixel whose brightness has changed within a current time period (e.g., pixel coordinates of the pixel whose brightness has changed). In the embodiments of the present disclosure, the adjacent data groups may include a same second quantity of data slices, and the first quantity may be greater than the second quantity.

In a second sub-step, the weighted calculation may be performed on the data slices in each data group using the generated weighting sequence. As mentioned above, when the pixel information includes the coordinates of the pixels, different weighting factors may be allocated to the pixel coordinates in each data group belonging to different data slices. For example, a weighting factor 1 may be allocated to all the pixel coordinates in a first data slice, a weighting factor 3 may be allocated to all the pixel coordinates in a second data slice, and so on. In addition, an initial value of a pixel whose brightness has changed may be set as 1, and a value of the corresponding data slice may be acquired through multiplying the initial value by the corresponding weighting factor. Next, the values of the first quantity of data slices may be added, so as to acquire final values corresponding to all the pixel coordinates in the data group. Then, the final values may be mapped to acquire an image frame representing the change in the scene within the corresponding time period. A mode of mapping a group of data into an image frame will not be particularly defined herein. In a possible embodiment of the present disclosure, the values corresponding to all the pixel coordinates in the data group may be mapped to a range of [0,255] with reference to a mode mentioned hereinafter, so as to acquire a grayscale image.

It should be appreciated that, apart from the pixel coordinates of each pixel whose brightness has changed, the pixel information may further include a brightness value of the pixel and a time when the brightness changes. The initial value of the pixel whose brightness has changed may be set as a constant for the weighted calculation, or the brightness value of the pixel itself may be set as the initial value for the weighted calculation, or the quantity of change times of the pixel may be set as the initial value for the weighted calculation, which will not be particularly defined herein.

In order to describe how to perform the weighted calculation on the data slices to generate the image frames representing the changes in the scene within different time periods, in some other embodiments of the present disclosure, Step S320 may include: (1) performing mapping processing on the plurality of data slices to generate a plurality of slice images; and (2) selecting the first quantity of slice images sequentially and performing the weighted calculation on the first quantity of slice images, to generate the image frames representing the changes in the scene within different time periods. Detailed description will be given as follows.

(1) Performing the mapping processing on the plurality of data slices to generate the plurality of slice images.

In other words, an image may be created for each data slice (in the embodiments of the present disclosure, a 768*640 image may be created, but the size of the image will not be particularly defined herein, as long as the size of the image corresponds to the quantity of pixel circuits in the dynamic vision sensor), and the pixels whose brightness has changed in the data slice may be mapped to the created image to acquire a slice image. It should be appreciated that, the slice image acquired through mapping may be a binary image or a grayscale image, which will not be particularly defined herein.

In the embodiments of the present disclosure, with respect to each data slice, the corresponding slice image may be acquired through mapping as mentioned hereinafter. At first, a pixel value corresponding to each pixel whose brightness has changed in the data slice may be mapped to a first value. In the embodiments of the present disclosure, the first value may be 255. Then, a pixel value corresponding to each pixel whose brightness has not changed in the data slice may be mapped to a second value. In the embodiments of the present disclosure, the second value may be 0. Finally, the binary slice image for the data slice may be created in accordance with the first value and the second value.

For example, the coordinates of the pixels whose brightness has changed in one data slice may be {(0,1), (0,6), (1,1), (2,3), (2,6), (4,2)}, and a 5*8 image may be created. Table 2 shows the pixel values for the slice image acquired through mapping. In Table 2, "0" at an upper left corner represents that the brightness of the pixel having coordinates (0,0) (i.e., the pixel in a $0^{th}$ row and a 0th column) does not change, "255" on the right represents that the brightness of the pixel having coordinates (0,1) (i.e., the pixel in the $0^{th}$ row and a $1^{st}$ column) has changed, and so on.

TABLE 2

Example of pixel values of slice image

| 0 | 255 | 0 | 0 | 0 | 0 | 255 | 0 |
|---|---|---|---|---|---|---|---|
| 0 | 255 | 0 | 0 | 0 | 0 | 0 | 0 |
| 0 | 0 | 0 | 255 | 0 | 0 | 255 | 0 |
| 0 | 0 | 0 | 0 | 0 | 0 | 0 | 0 |
| 0 | 0 | 255 | 0 | 0 | 0 | 0 | 0 |

In another possible embodiment of the present disclosure, with respect to each data slice, the corresponding slice image may be acquired through mapping as mentioned hereinafter. At first, the quantity of change times of each pixel in the data slice may be taken as an initial pixel value of the pixel. Then, the initial pixel value of each pixel may be mapped to a predetermined range to acquire the slice image for the data slice. In the embodiments of the present disclosure, the predetermined range may be [0, 255]. Of course, the predetermined range may also be [0, 1023], or any other range, which will not be particularly defined herein.

For example, the coordinates of the pixels whose brightness has changed in one data slice may be {(0,1), (0,6), (1,1), (0,6), (2,3), (2,6), (0,6), (1,1), (4,2)}, and a 5*8 image may be created. The quantity of change times of each pixel may be counted and taken as the initial pixel value of the pixel, so as to form an initial slice image. Table 3 shows the initial pixel values corresponding to the data slice.

TABLE 3

Example of initial pixel values corresponding to slice image

| 0 | 1 | 0 | 0 | 0 | 0 | 3 | 0 |
|---|---|---|---|---|---|---|---|
| 0 | 2 | 0 | 0 | 0 | 0 | 0 | 0 |
| 0 | 0 | 0 | 1 | 0 | 0 | 1 | 0 |
| 0 | 0 | 0 | 0 | 0 | 0 | 0 | 0 |
| 0 | 0 | 1 | 0 | 0 | 0 | 0 | 0 |

In Table 3, the pixel having coordinates (0,6) (i.e., the pixel in the $0^{th}$ row and a $6^{th}$ column) has changed for three times, so its initial pixel value may be marked as 3. The pixel having coordinates (1,1) (i.e., the pixel in a $1^{st}$ row and the $1^{st}$ column) has changed for twice, so its initial pixel value may be marked as 2.

Next, the acquired initial pixel values may be mapped to a predetermined range. In the embodiments of the present disclosure, the predetermined range may be [0, 255]. The initial pixel values may be mapped to the predetermined range using the following formula $$x' = \frac{x - \min}{\max - \min} \times 255,$$

where x represents the initial pixel value, x' represents a pixel value acquired after mapping, and max and min represent a maximum value and a minimum value in all the initial pixel values corresponding to the data slice respectively.

Table 4 shows the pixel values corresponding to the slice image after the initial pixel values in Table 3 have been mapped to [0,255].

TABLE 4

Example of pixel values corresponding to slice image

| 0 | 85 | 0 | 0 | 0 | 0 | 255 | 0 |
|---|----|---|---|---|---|-----|---|
| 0 | 170 | 0 | 0 | 0 | 0 | 0 | 0 |
| 0 | 0 | 0 | 85 | 0 | 0 | 85 | 0 |
| 0 | 0 | 0 | 0 | 0 | 0 | 0 | 0 |
| 0 | 0 | 85 | 0 | 0 | 0 | 0 | 0 |

It should be appreciated that, the above examples are merely used to describe the data processing method 300. In actual use, the case where the dynamic pixels are distributed may be more complex, and many mapping modes may be adopted, which will not be particularly defined herein. Based on the above, it should be appreciated that, the slice image for each data slice may be generated in the other mapping modes, which will not be particularly defined herein.

(2) Selecting the first quantity of slice images sequentially and performing the weighted calculation on the first quantity of slice images, to generate the image frames representing the changes in the scene within different time periods.

Figure 5:
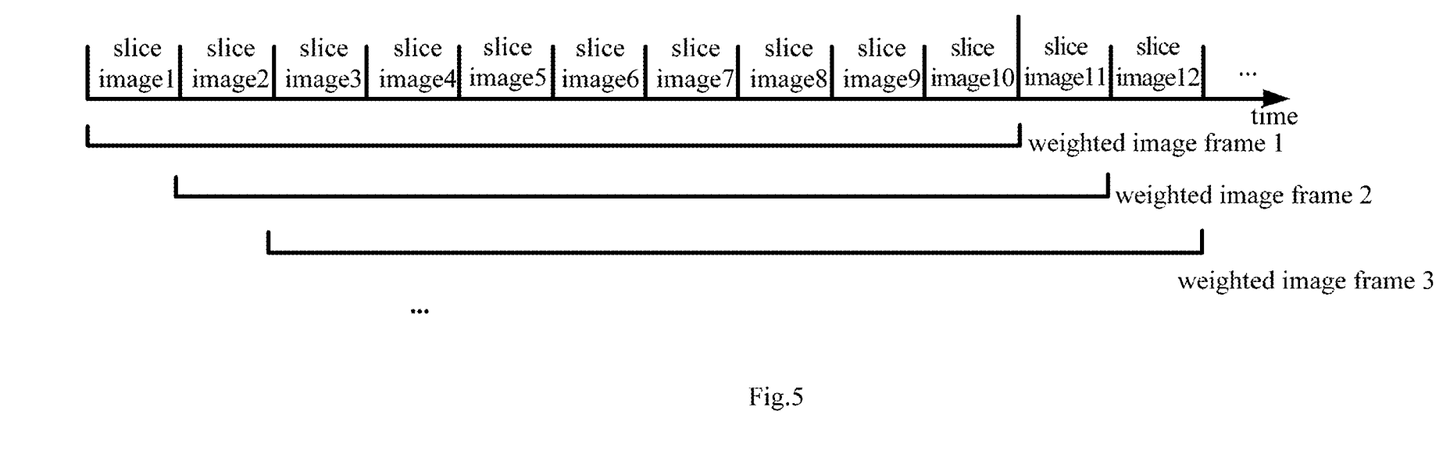
FIG. 5 is a schematic view showing the accumulated generation of image frames representing changes in a scene according to one embodiment of the present disclosure.

As mentioned hereinabove, after the generation of the weighting sequence ($w_1, w_2, w_3, \ldots w_i$), the slice images may be accumulated as follows. FIG. 5 shows the accumulated generation of the image frames representing the changes in the scene. In FIG. 5, sectors in a time axis represent slice images 1, 2, . . . generated sequentially. At first, the first quantity of slice images may be selected sequentially as an image group, and the adjacent data groups may include a same second quantity of slice images. In the embodiment as shown in FIG. 5, the first quantity may be 10, and the second quantity may be 9. Of course, in the embodiments of the present disclosure, the values of the first quantity and the second quantity will not be particularly defined, as long as the first quantity is greater than the second quantity. Then, the weighted calculation may be performed on the slice images in each image group using the weighting sequence, to generate the image frame representing the change in the scene within a corresponding time period (the image frame may be considered as a weighted image frame on the basis of the slices within a plurality of time periods). In other words, starting from a $10^{th}$ slice image, a weighted image frame corresponding to the previous 10 slice images may be outputted. As shown in FIG. 5, the $1^{st}$ to the $10^{th}$ slice images may be accumulated to acquire a weighted image frame 1, the $2^{nd}$ to the $11^{th}$ slice images may be accumulated to acquire a weighted image frame 2, the $3^{rd\ to}$ the $12^{th}$ slice images may be accumulated to acquire a weighted image frame 3, and so on.

In a word, a process of the weighted calculation may be represented using the following formula:

$$\text{Multi\_Slice}(T) = \sum_{i=1}^{N} w_i \times \text{Frame}(T + i - 1),$$

where N represents the first quantity, $w_i$ represents an $i^{th}$ weighting factor in the weighting sequence, and Frame(i) represents an $i^{th}$ slicing image in the image group.

Figure 6:
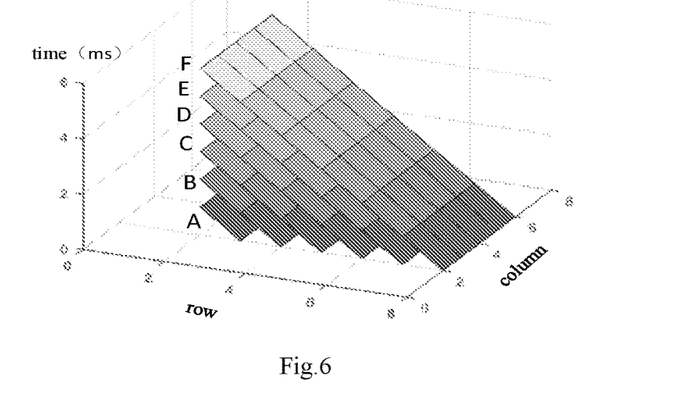
FIG. 6 is a schematic view showing a plurality of weighted image frames according to one embodiment of the present disclosure.

The weighted image frame has been calculated as mentioned above. FIG. 6 shows a plurality of weighted image frames A, B, C, D, E and F generated over time. As shown in FIG. 6, there is a certain inclination angle of the weighted image frame generated using the data processing scheme in the embodiments of the present disclosure relative to an X-Y plane. In other words, the weighted frame image may have a certain gradient and a certain aspect. The gradient and the aspect of the weighted image frame may be calculated using such an algorithm as Meanshift algorithm. For example, a slope crest (maximum value) and a slope base (minimum value) may be determined, and then a shortest path between the slope crest and the slope base may be calculated through the Meanshift algorithm. At this time, a direction pointed by the path is just the aspect, and an angle of the path relative to the XY plane is just the gradient. Usually, the movement direction of the object in the scene may be acquired in accordance with the aspect, and a relative change in the movement speed of the object may be determined in accordance with the gradient. It should be appreciated that, one method for calculating the gradient and the aspect of the weighted image frame has been described hereinabove, so as to analyze the movement direction and the movement speed of the object. Actually, on the basis of the weighted image frame, the gradient and the aspect may be calculated using various algorithms so as to analyze the movement direction and the movement speed of the object moving in the scene, and these algorithms all fall within the scope of the present disclosure.

Figure 7:
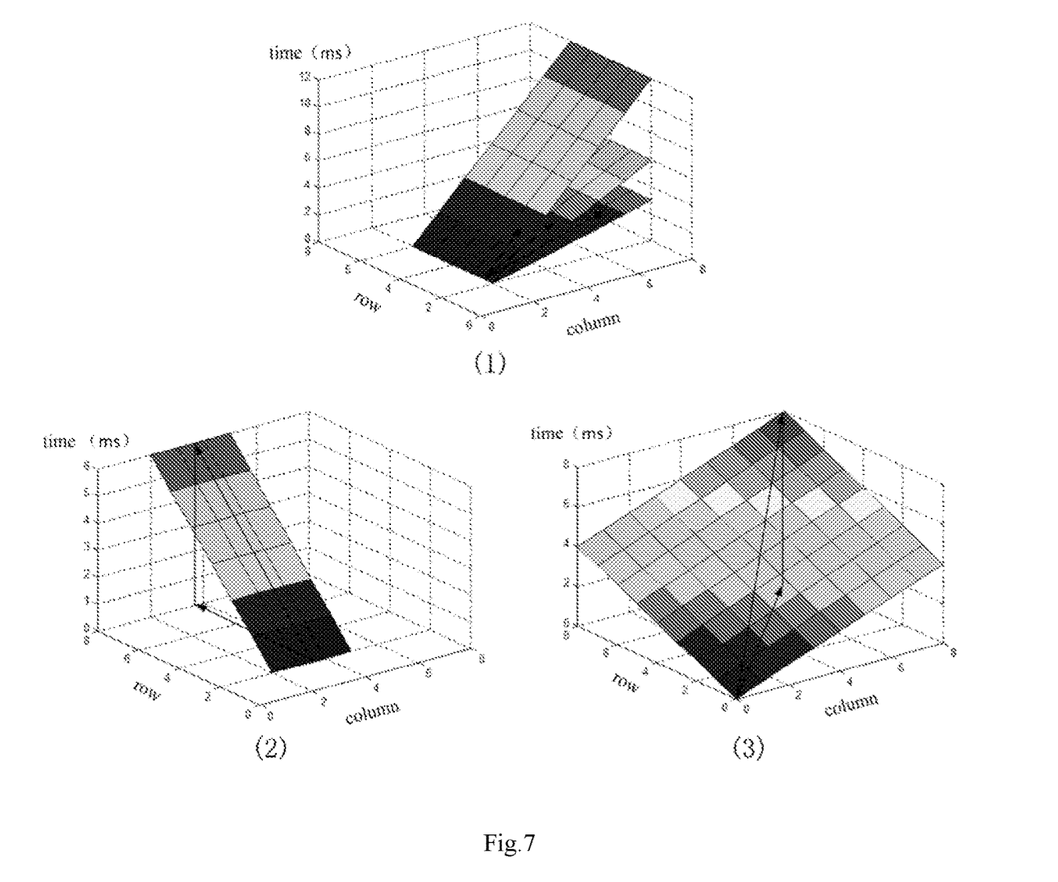
FIG. 7 is a schematic view showing the weighted image frames corresponding to three typical movement directions according to one embodiment of the present disclosure.

As shown in FIG. 6, the longer the time, the larger the gradient of the weighted image frame acquired through superimposition; the later the time, the larger the corresponding weighting factor and the larger the gradient of the weighted image frame acquired through superimposition. The movement direction and the movement speed of the object moving in the scene may be calculated in accordance with the gradient and aspect of a slope formed by the image frames representing the changes in the scene within different time periods (i.e., the weighted image frames). Due to different movement directions and movement speeds of the object, different event data flows may be generated by the dynamic vision sensor. When a superimposition mode for the weighted image frames in FIG. 6 is adopted, different movement modes may correspond to different aspects and gradients. FIG. 7 shows the weighted image frames corresponding to three typical movement directions. In FIG. 7, (1) represents the weighted image formed when the object moves in the scene in a same direction and at different movement speeds. Due to the same movement direction, the aspect of the three weighted image frames are the same, but the gradients are different. In addition, (2) and (3) represent the weighted image frames formed when the object moves in other different directions, and each arrow represents the aspect of the weighted image frame.

In some other embodiments of the present disclosure, in order to display the weighted image frame in more intuitive manner, mapping processing may be further performed on the weighted image, so as to acquire a grayscale value of each pixel point in the weighted image frame and display the weighted image frame as a grayscale image. To be specific, after the weighted calculation on the slice images in each image group using the weighting sequence to acquire a weighted image corresponding to each image group, each pixel value of the weighted image may be mapped to a predetermined range to generate the image frame representing the change in the scene within the corresponding time period. The mapping method mentioned hereinabove may be adopted, or any other mapping method may be adopted, which will not be particularly defined herein. It should be appreciated that, the mapping processing is performed so as to display the weighted image frame in a better manner, and the analysis on the movement direction and the movement speed in accordance with the weighted image frame will not be adversely affected.

According to the data processing scheme in the embodiments of the present disclosure, the event data flow may be sliced sequentially, and the plurality of data slices may be superimposed in accordance with a certain weight to acquire the weighted image frame representing the change in the scene within a certain time period. Especially, a change tendency of the weighting sequence (e.g., whether the weighting factors in the weighting sequence increases or decreases monotonically) may be set according to the analysis requirement. Based on the weighted image frame, it is able to conveniently and effectively analyze the movement speed and the movement direction of the object in the scene within a certain time period, thereby to improve the speed of the optical flow calculation. In addition, according to the data processing scheme in the embodiments of the present disclosure, the data slice may be mapped to the slice image, and then the weighted calculation may be performed on the slice images using a same weighting mode to acquire the weighted image frame.

It should be appreciated that, although with a large number of details, these specific details are not necessary for the implementation of the present disclosure. In some embodiments of the present disclosure, the known method, structure or technology is not shown, so as to facilitate the understanding of the present disclosure in a better manner.

It should be further appreciated that, sometimes the features of the present disclosure are described in conjunction with a single embodiment or figure, so as to facilitate the understanding of one or more aspects of the present disclosure. However, the method in the present disclosure shall not be construed as to reflect the intention that the present disclosure asks for more features than those specified in each claims. More definitely, as reflected in the appended claims, the creative aspect lies in the features less than all the features in the above-mentioned single embodiment. Hence, each claim following a specific embodiment may be definitely incorporated into the specific embodiment, and each claim itself may serve as an individual embodiment of the present disclosure.

It should be further appreciated that, modules, units or components in the above examples may be arranged in the device described in the embodiments, or in one or more devices different from the device. The modules may be combined into one module, or each module may be divided into a plurality of submodules.

It should be further appreciated that, the modules may be modified adaptively and arranged in one or more devices different from that mentioned hereinabove. The modules, units or components may be combined into one module, unit or component, or each module, unit or component may be divided into a plurality of submodules, subunits or subcomponents. Apart from the features, processes or units conflicting with each other, all the features, processes or units involved in the specification (including the appended claims, abstract and drawings) may be combined in any form. Unless otherwise defined, each feature in the specification (including the appended claims, abstract and drawings) may be replaced with a same, equivalent or similar feature.

The followings are also provided in the embodiments of the present disclosure.

A9. The data processing method according to A6, wherein the selecting the first quantity of data slices sequentially and performing weighted calculation on the first quantity of data slices to generate the image frames representing the changes in the scene within different time periods includes: selecting a first quantity of slice images as an image group sequentially, the adjacent data groups including a same second quantity of slice images; and performing the weighted calculation on the slice images in each image group using the weighting sequence, to generate the image frame representing the change in the scene within a corresponding time period.

A10. The data processing method according to A5 or A9, wherein the first quantity is greater than the second quantity.

A11. The data processing method according to A9, wherein an image frame Multi_Slice(T) representing the change in the scene within a $T^{th}$ time period is calculated using the following formula:

$$\text{Multi\_Slice}(T) = \sum_{i=1}^{N} w_i \times \text{Frame}(T + i - 1),$$

where N represents the first quantity, $w_i$ represents an $i^{th}$ weighting factor in the weighting sequence, and Frame(i) represents an $i^{th}$ slice image in the image group.

A12. The data processing method according to any one of A9 to A11, wherein the performing the weighted calculation on the slice images in each image group using the weighting sequence to generate the image frames representing the change in the scene within a corresponding time period includes: performing the weighted calculation on the slice images in each image group using the weighting sequence to acquire a weighted image corresponding to each image group; and mapping each pixel value of the weighted image to a predetermined range to generate the image frame representing the change in the scene within the corresponding time period.

A13. The data processing method according to any one of A8 to A12, wherein the predetermined range is [0, 255].

In addition, it should be appreciated that, although some embodiments include some features in the other embodiments, the combination of the features in different embodiments may also fall within the scope of the present disclosure. For example, the features in the appended claims may be combined in any form.

In addition, some of the embodiments have been described as a combination of methods or method elements capable of being implemented by a processor of a computer system or any other device. Hence, the processor including necessary instructions for implementing the methods or the method elements may be used to form a device for implementing the methods or the method elements. In addition, the device is used to achieve functions of the elements.

Unless otherwise defined, such ordinal numerals as "first", "second" and "third" are merely used to differentiate different components rather than to represent any order, number or importance.

Although with the above embodiments, a person skilled in the art may obtain the other embodiments, which also fall within the scope of the present disclosure. In addition, it should be appreciated that, the words are selected in the present disclosure principally for readability and guidance, but shall not be construed as limiting the scope of the present disclosure. Obviously, a person skilled in the art may make further modifications and improvements without departing from the spirit of the present disclosure. The above description is for illustrative but not restrictive purposes, and the scope of the present disclosure shall be subject to the appended claims.

What is claimed is:

1. A data processing method for processing an event data flow from a Dynamic Vision Sensor (DVS) to acquire image frames representing changes in a scene within different time periods, the event data flow comprising coordinates of each pixel whose brightness has changed, wherein the data processing method comprises:
   segmenting the event data flow into a plurality of data slices at a predetermined time interval; and
   selecting a first quantity of data slices sequentially and performing weighted calculation on the first quantity of data slices to generate the image frames representing the changes in the scene within different time periods, comprises:
   performing mapping processing on the plurality of data slices to generate a plurality of slice images, wherein, with respect to each data slice, counting the quantity of change times of each pixel in the data slice as an initial pixel value of each pixel; and mapping the initial pixel value of each pixel to a predetermined range to acquire the slice image of the data slice; and
   selecting a first quantity of slice images sequentially and performing the weighted calculation on the first quantity of slice images, to generate the image frames representing the changes in the scene within different time periods.

2. The data processing method according to claim 1, further comprising calculating a movement direction and a movement speed of an object moving in the scene in accordance with the image frames representing the changes in the scene within different time periods.

3. The data processing method according to claim 2, further comprising generating a weighted sequence in accordance with a predetermined rule to perform the weighting calculation on the first quantity of data slices, wherein the weighting sequence comprises a first quantity of weighting factors.

4. The data processing method according to claim 3, wherein in the predetermined rule, the weighting factors in the weighting sequence change monotonically.

5. The data processing method according to claim 4, wherein the selecting the first quantity of data slices sequentially and performing weighted calculation on the first quantity of data slices to generate the image frames representing the changes in the scene within different time periods comprises: selecting the first quantity of data slices as a data group sequentially, the adjacent data groups comprising a same second quantity of data slices; and performing the weighted calculation on the data slices in each data group using the weighting sequence, to generate the image frame representing the change in the scene within a corresponding time period.

6. The data processing method according to claim 1, wherein the performing the mapping processing on the plurality of data slices to generate the plurality of slice images comprises: with respect to each data slice, mapping a pixel value corresponding to coordinates of a pixel in the data slice whose brightness has changed to a first value; mapping a pixel value corresponding to coordinates of a pixel in the data slice whose brightness has not changed to a second value; and creating the slice image of the data slice in accordance with the first value and the second value.

7. A computing device, comprising one or more processors, a memory, and one or more programs stored in the memory and executed by the one or more processors, wherein the one or more programs comprise instructions for implementing the data processing method according to claim 1.

8. A non-transitory computer-readable storage medium storing therein one or more programs comprising instructions, wherein the instructions are executed by a computing device in order to implement the data processing method according to claim 1.

* * * * *